(12) United States Patent
Leeman et al.

(10) Patent No.: US 11,887,338 B2
(45) Date of Patent: Jan. 30, 2024

(54) MAINTAINING CALIBRATION OF AN IBIS CAMERA

(71) Applicant: Motional AD LLC, Boston, MA (US)

(72) Inventors: Peter Leeman, Pittsburgh, PA (US); Nijumudheen Muhassin, Jefferson Hills, PA (US); Jayesh Dwivedi, Oakmont, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/807,259

(22) Filed: Jun. 16, 2022

(65) Prior Publication Data
US 2023/0410365 A1    Dec. 21, 2023

(51) Int. Cl.
*G06T 7/80* (2017.01)
*H04N 23/68* (2023.01)

(52) U.S. Cl.
CPC ........... *G06T 7/80* (2017.01); *H04N 23/6812* (2023.01); *G06T 2207/10044* (2013.01); *G06T 2207/30252* (2013.01)

(58) Field of Classification Search
CPC ............. G06T 7/80; G06T 2207/30252; G06T 2207/10044; H04N 23/60; H04N 23/68; H04N 23/6812
See application file for complete search history.

(56) References Cited

U.S. PATENT DOCUMENTS

| | | | | |
|---|---|---|---|---|
| 8,885,049 B2 * | 11/2014 | Miksch | ................ | H04N 17/002 348/148 |
| 10,547,784 B2 * | 1/2020 | Sun | ................... | H04N 23/6812 |
| 10,552,982 B2 * | 2/2020 | Loy | ........................ | G06V 10/82 |
| 10,565,736 B2 * | 2/2020 | Oba | .......................... | G06T 7/80 |
| 10,567,628 B2 * | 2/2020 | Shimatani | .............. | H04N 23/57 |
| 10,620,000 B2 * | 4/2020 | Sakano | ................... | G01B 11/26 |
| 10,726,579 B1 * | 7/2020 | Huang | .................. | G01S 7/4972 |
| 10,867,409 B2 * | 12/2020 | Jin | .................... | B60W 50/0205 |
| 10,897,575 B2 * | 1/2021 | Wheeler | ............... | G01S 17/931 |
| 11,067,693 B2 * | 7/2021 | Walls | ...................... | G06V 20/56 |
| 11,157,766 B2 * | 10/2021 | Han | .......................... | G06T 7/80 |
| 11,641,461 B2 * | 5/2023 | Rohatgi | ................... | G06T 7/20 348/148 |
| 2011/0109755 A1 * | 5/2011 | Joshi | .................... | H04N 23/683 348/208.5 |
| 2016/0171703 A1 * | 6/2016 | Rhee | ...................... | H04N 23/60 382/154 |

(Continued)

OTHER PUBLICATIONS

Github.io [online], "Dissecting the Camera Matrix, Part 2: The Extrinsic Matrix," Aug. 22, 2012, retrieved on Sep. 12, 2023, retrieved from URL <https://ksimek.github.io/2012/08/22/extrinsic/>, 5 pages.

*Primary Examiner* — Brian P Yenke
(74) *Attorney, Agent, or Firm* — Fish & Richardson P.C.

(57) ABSTRACT

Provided are methods for maintaining calibration of an IBIS camera, which can include receiving a first initial extrinsic calibration of a first camera having a first sensor; determining a first translation of the first sensor based on a second position thereof when the first camera captures a first image; determining a first extrinsic translation shift based at least upon the first translation; and updating the first initial extrinsic calibration to yield a first modified extrinsic calibration for the first camera. Systems and computer program products are also provided.

27 Claims, 8 Drawing Sheets

(56) References Cited

U.S. PATENT DOCUMENTS

| | | | |
|---|---|---|---|
| 2019/0122386 A1* | 4/2019 | Wheeler | G05D 1/0248 |
| 2019/0236807 A1* | 8/2019 | Zhang | G06T 7/70 |
| 2021/0134079 A1* | 5/2021 | Nee | G01S 7/4972 |
| 2022/0174216 A1* | 6/2022 | Ozone | H04N 23/683 |
| 2022/0180484 A1* | 6/2022 | Jia | G06T 5/20 |
| 2022/0194412 A1* | 6/2022 | Zhang | B60W 60/001 |
| 2022/0262037 A1* | 8/2022 | Nakano | G06T 3/20 |
| 2022/0262069 A1* | 8/2022 | Singh | G06T 17/10 |
| 2022/0414933 A1* | 12/2022 | Sung | G06T 7/80 |
| 2023/0135230 A1* | 5/2023 | Faust | H04N 23/90 |
| | | | 348/188 |

* cited by examiner

MAINTAINING CALIBRATION OF AN IBIS CAMERA

BACKGROUND

Vehicles, such as autonomous vehicles, use sensors to identify objects in their surrounding environment. These sensors may include cameras, LiDAR sensors, radar sensors, and other types of sensors. Output of the sensors can be merged to generate a more detailed representation of the surrounding environment compared to the output of a single sensor or single type of sensor.

DETAILED DESCRIPTION

Figure 1:
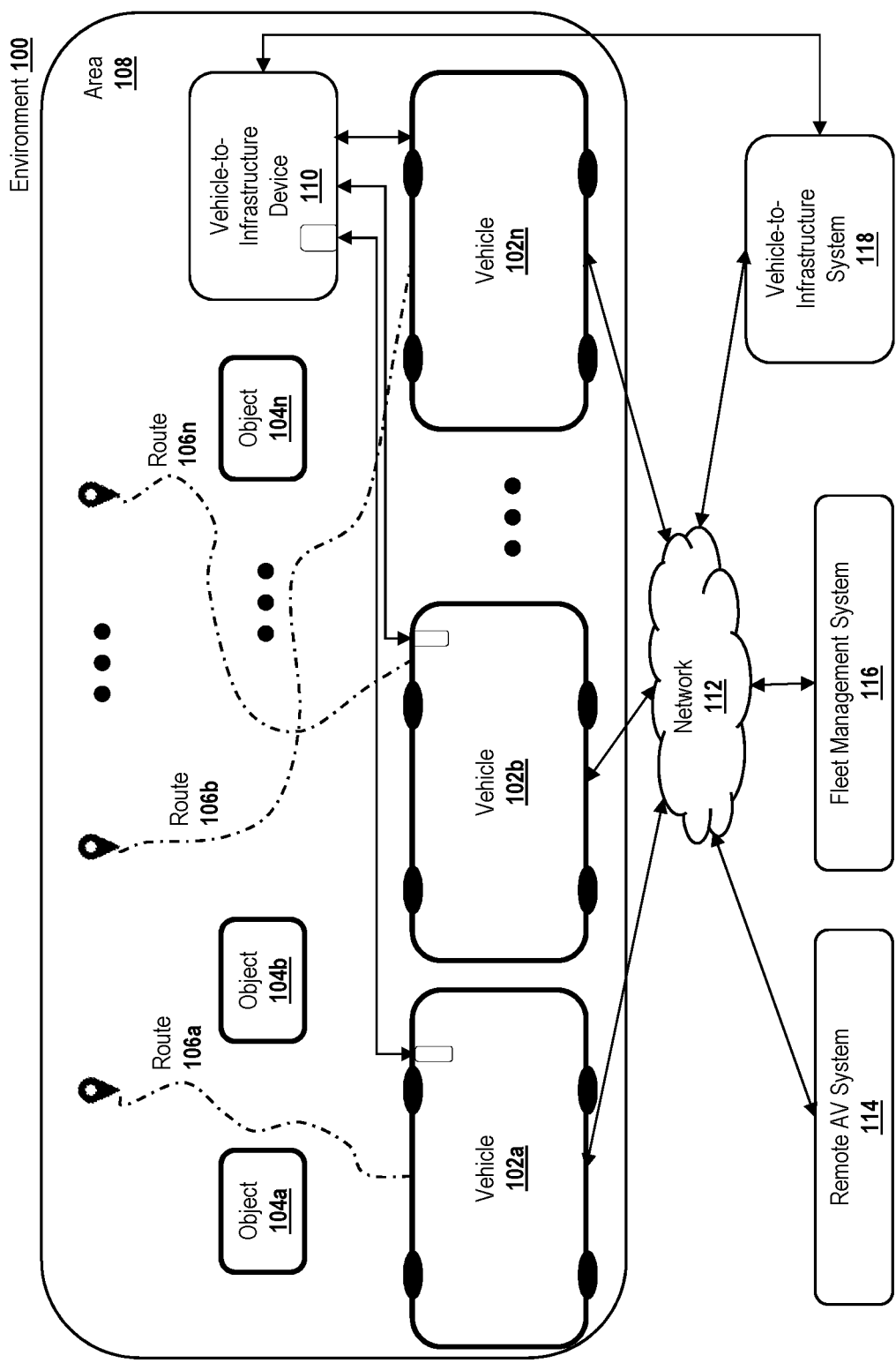
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

A vehicle (such as an autonomous vehicle) can have one or more cameras and other sensors (e.g., another camera, LiDAR, radar) to scan the area surrounding the vehicle. The cameras can include an in-body image stabilization (IBIS) system that translates the camera sensor to compensate for vibration and shake. However, translation of the camera sensor invalidates an extrinsic calibration used for fusion of data from the cameras and the other sensors. A method for modifying extrinsic calibration is provided to compensate for IBIS camera translation and maintain extrinsic calibration.

The extrinsic calibration modification process allows extrinsic calibration to be maintained between IBIS cameras while also retaining the benefits of the IBIS camera. Maintaining the extrinsic calibration provides more accurate sensor fusion for perception. Reduction of camera vibration also allows for longer exposure times, which is beneficial under low light conditions. Isolating the camera image sensor from vehicle vibrations further reduces motion blur. The extrinsic calibration modification process can be performed in real-time without heavy use of computational resources.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
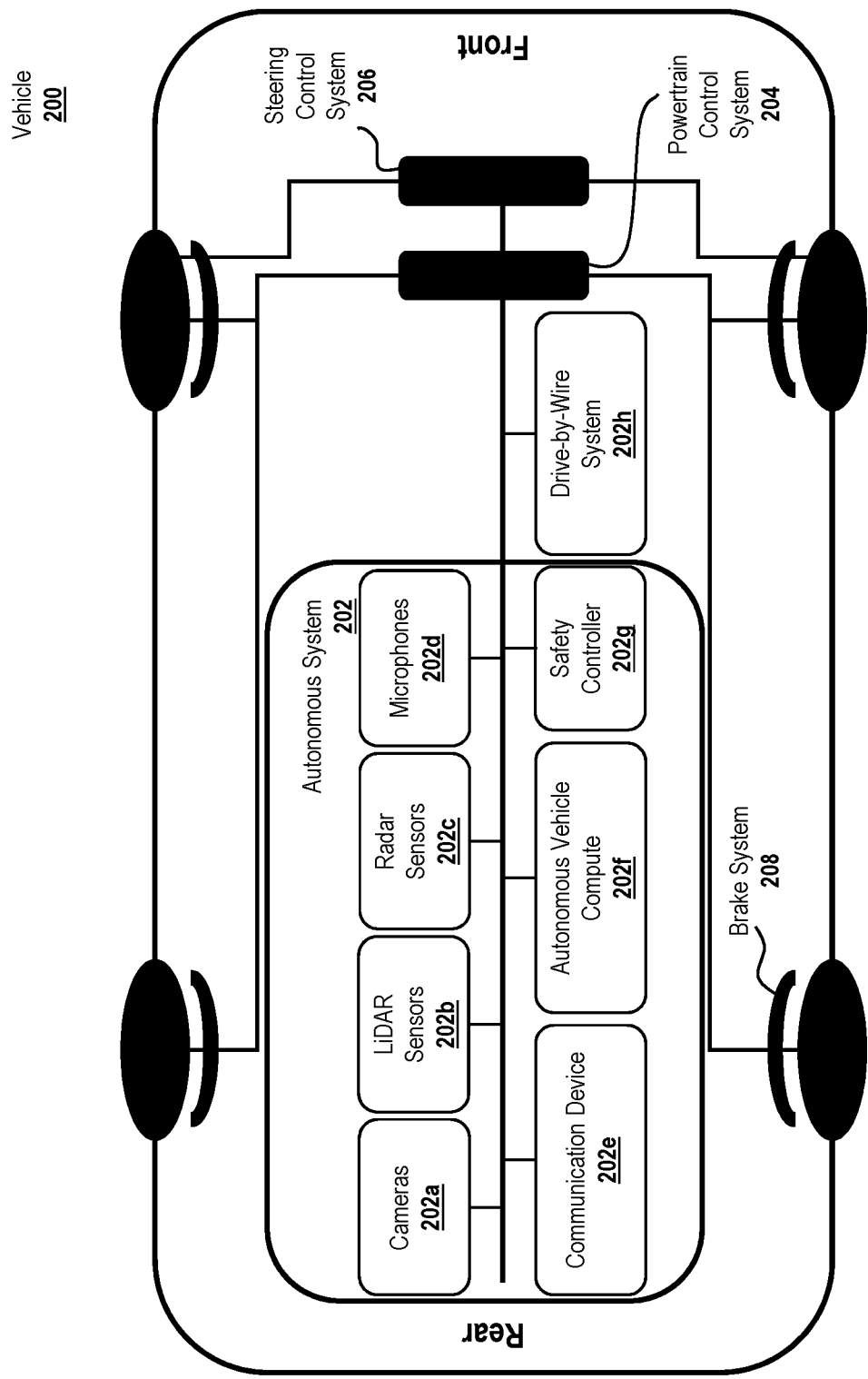
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one autonomous driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
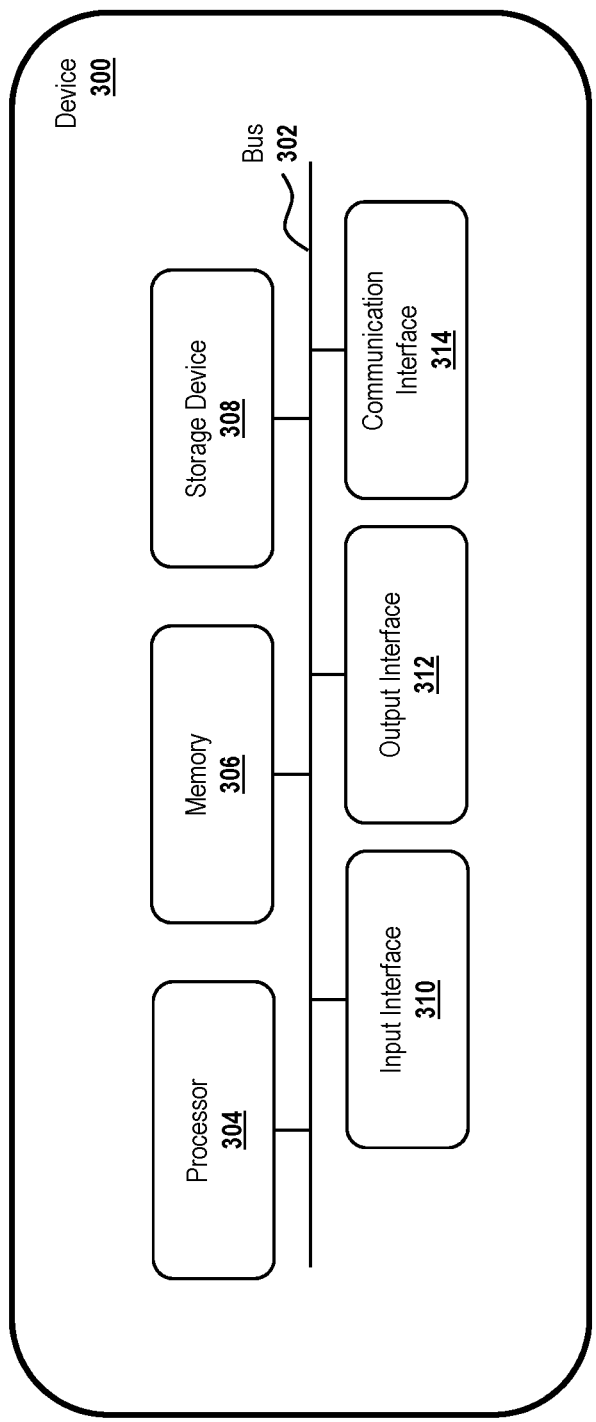
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
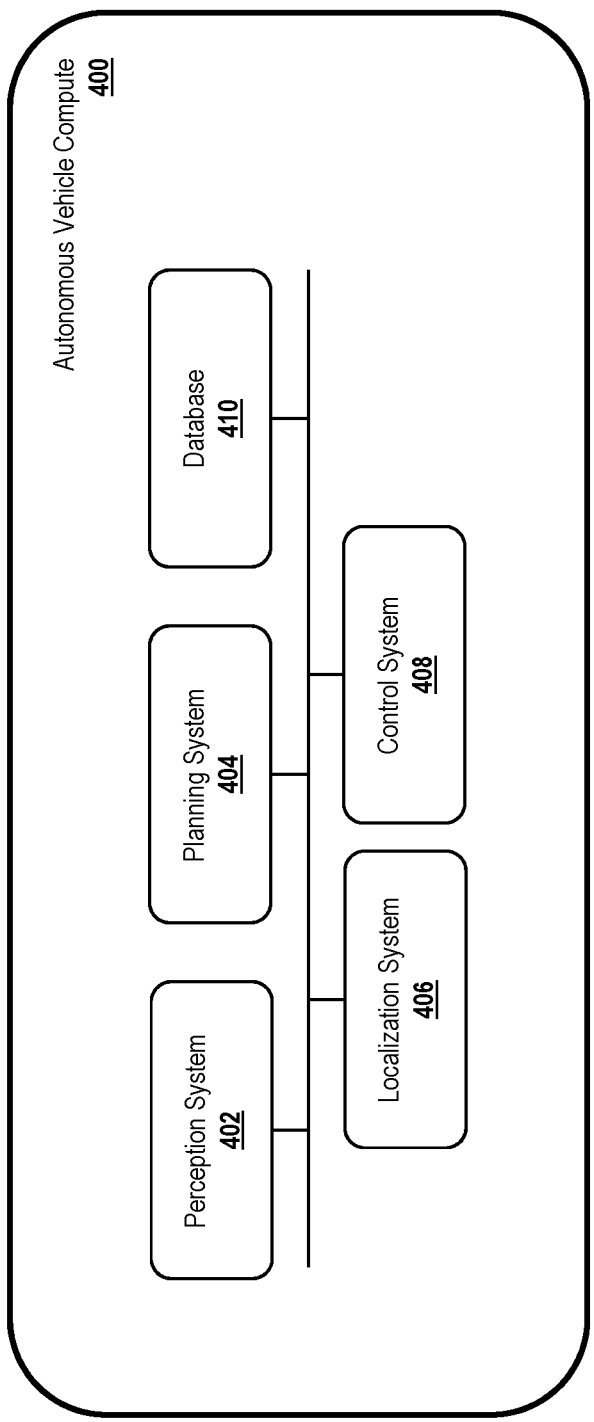
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Referring now to FIGS. 5-8, illustrated are diagrams of an implementation 500 of a process for maintaining calibration of an IBIS camera. In some embodiments, implementation 500 includes an IBIS camera 502, a calibration system 510, and another sensor 516.

Figure 5:
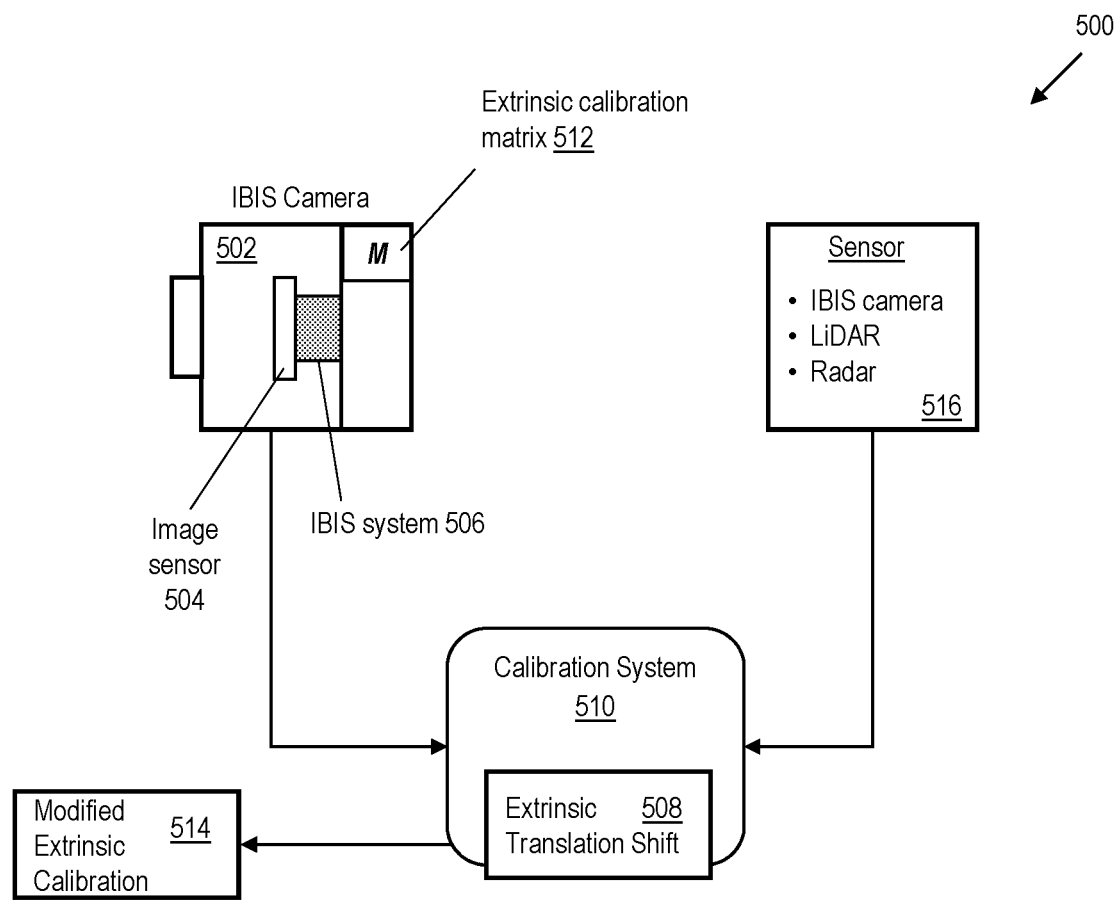
FIGS. 5-7 are diagrams of an implementation of a process for maintaining calibration of an IBIS camera.

FIG. 5 shows an IBIS camera 502 and associated components. In some embodiments, the IBIS camera 502 is an example of one of the cameras 202a (FIG. 2). IBIS (in-body image stabilization) is a system that reduces vibration and shake by moving a sensor to compensate for the unwanted motion. Accordingly, the image sensor 504 of the IBIS camera 502 moves to compensate for e.g., the movement of a vehicle 200 (FIG. 2). As the vehicle 200 moves and encounters conditions causing vibration and shake, images produced by the IBIS camera 502 will be relatively stable and not exhibit changes across multiple images based on vibration or shake. The compensation is effectuated by an IBIS system 506.

Compensation of unwanted motion can cause sensor fusion performance issues. In some embodiments, the perception system 402 (FIG. 4) of the vehicle 200 fuses output of multiple sensor systems. The coordinate systems of the multiple sensor systems will be misaligned due to an active shift in translational motion of the output of the IBIS camera. For example, if the perception system 402 fuses output of the IBIS camera 502 and another sensor 516 (e.g., a LiDAR sensor 202b or radar sensor 202c as shown in FIG. 4, or another camera), the coordinate systems of the two must be aligned for the perception system 402 to fuse the outputs of the two in a manner that is spatially accurate.

For example, if the perception system 402 projects the outputs of two sensors (e.g., the camera and LiDAR sensor) onto a common plane for the purpose of overlaying one upon the other, the perception system 402 translates the coordinate systems of the two sensors to a common coordinate system. Thus, the perception system 402 uses information about the relationship between the two coordinate systems to project the outputs on a common plane. This technique is sometimes referred to as rectification.

In some embodiments, the coordinate systems between two sensor systems (e.g., the IBIS camera 502 and a LiDAR sensor 202b) are typically translated between one another using a calibration performed at the vehicle factory. For example, each of the two sensor systems has its own coordinate system, and a calibration process is used to measure their spatial relationship to each other (e.g., based on their location in physical space as mounted on the vehicle 200). The calibration process then generates a calibration matrix that is used to translate the coordinate system of one of the sensors to the coordinate system of the other of the sensors. This calibration matrix is sometimes referred to as an extrinsic calibration matrix. The calibration matrix is an extrinsic calibration matrix because the calibration matrix is used to translate to a coordinate system extrinsic to the particular sensor (e.g., extrinsic to the IBIS camera 502). Put another way, an extrinsic calibration matrix is used to translate a sensor's coordinate system to the coordinate system of another sensor.

In order to account for the movement of the image sensor 504 caused by the IBIS system 506, the perception system 402 re-calibrates the translation between coordinate systems (e.g., in real time). In some embodiments, a calibration system 510 associated with the perception system 402 generates an extrinsic translation shift 508 that can be applied to the existing extrinsic calibration matrix 512.

In use, the calibration system 510 determines the extrinsic translation shift 508 based on movement of the image sensor 504 effectuated by the IBIS system 506. In an embodiment, the calibration system 510 receives information from the IBIS camera 502 about movement of the image sensor 504 effectuated by the IBIS system 506. In an example scenario, at a particular moment in time, the IBIS system 506 causes the image sensor 504 to shift by +2 pixels on the X-axis and −3 pixels on the Y-axis. In response, the calibration system 510 generates an extrinsic translation shift 508 which can be added to the extrinsic calibration matrix 512 to translate the coordinate systems of the two sensors in a manner that accounts for the activity of the IBIS system 506. In some embodiments, the calibration system 510 generates a modified extrinsic calibration 514 that is the combination of the extrinsic calibration matrix 512 and the extrinsic translation shift 508. In some embodiments, the extrinsic translation shift 508 is determined in real time, e.g., for every frame produced by the IBIS camera 502. Similarly, in some embodiments, the modified extrinsic calibration 514 is generated for every frame produced by the IBIS camera 502.

Figure 6:
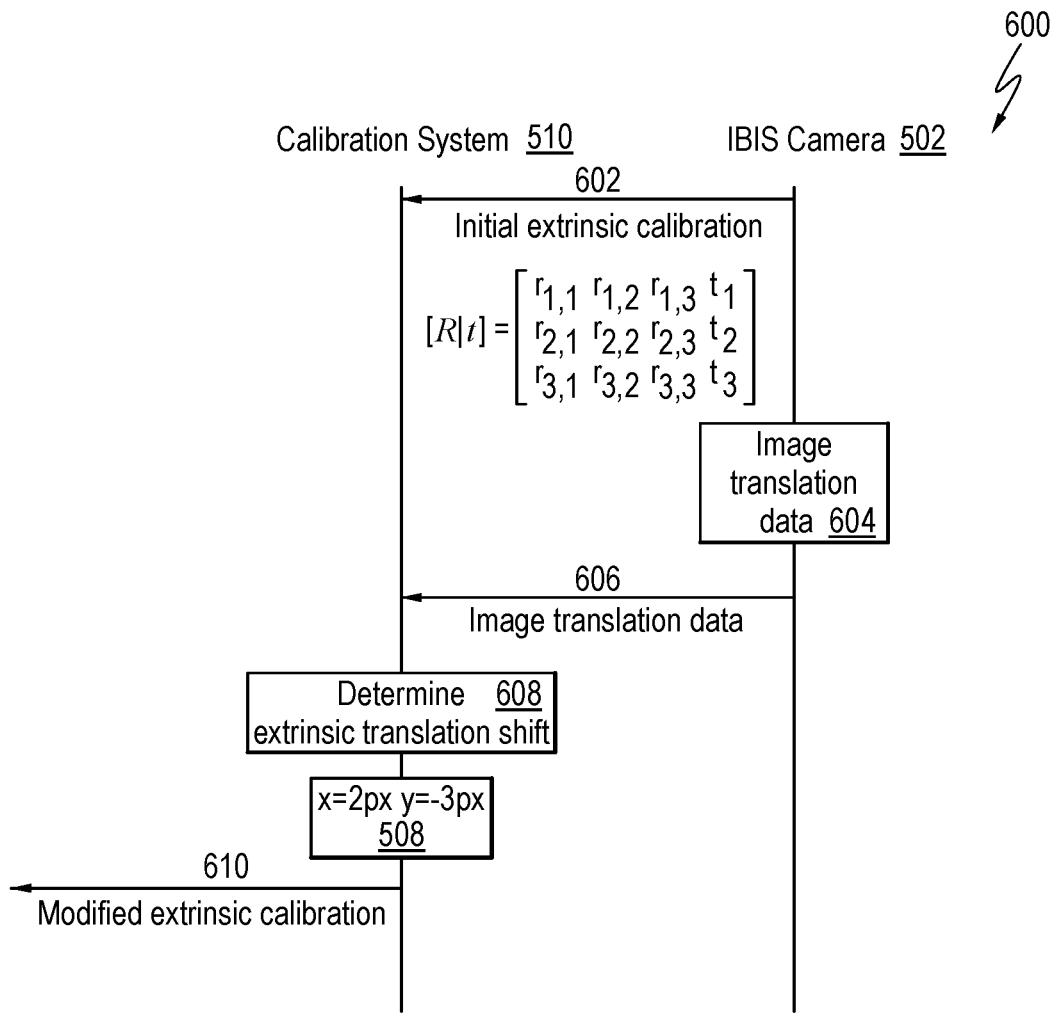

Referring now to FIG. 6, illustrated is a detailed view 600 of operations that occur to produce a modified extrinsic calibration 514. A calibration system 510 receives 602 an initial extrinsic calibration matrix 512. In some embodiments, as shown in FIG. 6, the extrinsic calibration matrix 512 is obtained from an IBIS camera 502 (e.g., from a memory device of the IBIS camera 502). In some embodiments, the extrinsic calibration matrix 512 is obtained from another system. In some embodiments, the extrinsic calibration matrix 512 includes both a rotation matrix and a translation matrix, as shown in the example presented in FIG. 6.

In some embodiments, the IBIS camera 502 determines image translation data 604, e.g., as caused by motion of the image sensor 504 of the IBIS camera 502. In some examples, the image translation data 604 includes information about x-axis and y-axis motion of the image sensor 504. The image translation data 604 is provided 606 to the calibration system 510. The calibration system 510 determines 608 an extrinsic translation shift 508 based on the image translation data 604. In some embodiments, the extrinsic translation shift 508 is a translation matrix offset, e.g., indicating an x-axis offset and a y-axis offset. For example, because an IBIS system 506 affects x-axis or y-axis motion of an image sensor 504 relative to the IBIS camera 502, the extrinsic translation shift 508 includes a translation matrix offset but does not include a rotation matrix offset. In contrast, an extrinsic calibration matrix 512 includes a translation matrix and a rotation matrix because the IBIS camera 502 may be oriented differently (e.g., oriented to a different Z-axis) than another sensor.

A modified extrinsic calibration 514 is then provided 610 by the calibration system 510, e.g., to a perception system 402 for the purpose of fusing output of the IBIS camera 502 with output of another sensor.

Figure 7:
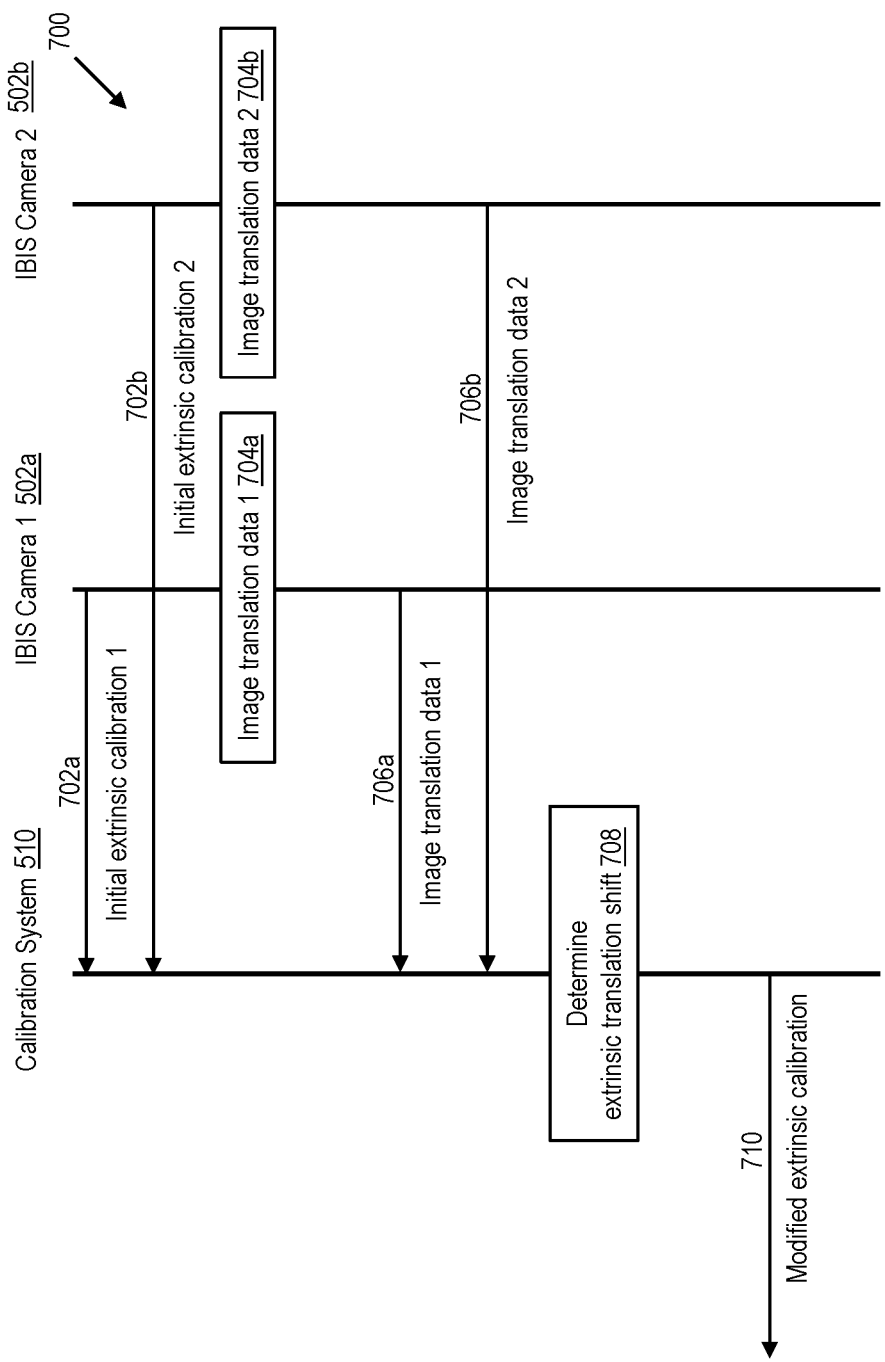

Referring now to FIG. 7, illustrated is a detailed view 700 of operations that occur to produce modified extrinsic calibrations 514 when two IBIS cameras 502*a*, 502*b* are used, e.g., when images from the two cameras will be fused by the perception system 402. When two IBIS cameras 502*a*, 502*b* are used, both cameras will use translation shifts.

A calibration system 510 receives 702*a*, 702*b* initial extrinsic calibration matrices for the two IBIS cameras 502*a*, 502*b*.

In some embodiments, the IBIS cameras 502*a*, 502*b* determine respective image translation data 704*a*, 704*b*. The image translation data 704*a*, 704*b* represents translations caused by motion of the image sensors of the respective cameras. The image translation data 704*a* for the first IBIS camera 502*a* is different from the image translation data 704*b* for the first IBIS camera 502*b* because the respective image sensors of the IBIS cameras 502*a*, 502*b* move independently of each other.

The image translation data 704*a*, 704*b* from each IBIS camera 502*a*, 502*b* is provided 706*a*, 706*b* to the calibration system 510. The calibration system 510 determines 708 an extrinsic translation shift for each IBIS camera 502*a*, 502*b* based on the respective image translation data 704*a*, 704*b*.

Modified extrinsic calibrations for each of the two cameras are then provided 710 by the calibration system 510, e.g., to a perception system 502 for the purpose of fusing output of the first IBIS camera 502*a* with output of the second IBIS camera 502*b*.

In some embodiments, a single extrinsic translation shift and single modified extrinsic calibration is generated for the two cameras. In an example scenario, the image translation data 704*a* for the first IBIS camera 502*a* indicates a translation of +2px on the X-axis and −3px on the Y-axis, and the image translation data 704*b* for the second IBIS camera 502*b* indicates a translation of −2px on the X-axis and +4px on the Y-axis. The sum of the translation values is 0px on the X-axis and +1px on the Y-axis. Accordingly, in this example scenario, a single extrinsic translation shift generated by the calibration system 510 represents a shift of 0px on the X-axis and +1px on the Y-axis, and a single modified extrinsic calibration provided by the calibration system 510 represents this single extrinsic translation shift.

Figure 8:
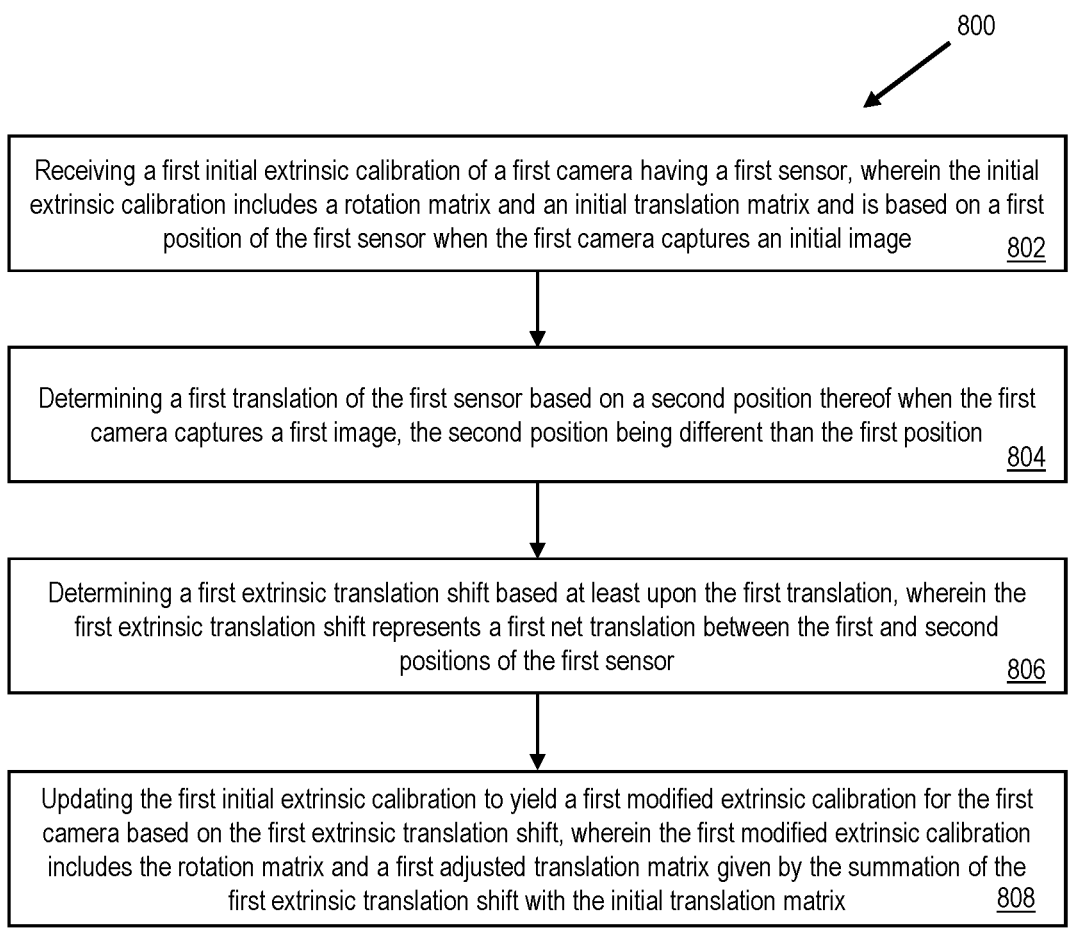
FIG. 8 is a flowchart of a process for maintaining calibration of an IBIS camera.

Referring now to FIG. 8, illustrated is a flowchart of a process 800 for maintaining calibration of an IBIS camera. In some embodiments, one or more of the steps described with respect to process 600 are performed (e.g., completely, partially, and/or the like) by the calibration system 510 (FIG. 5). Additionally, or alternatively, in some embodiments one or more steps described with respect to process 800 are performed (e.g., completely, partially, and/or the like) by another device or group of devices separate from or including the calibration system 510, e.g., the perception system 402 (FIG. 4).

With continued reference to FIG. 8, calibration system 510 receives a first initial extrinsic calibration of a first camera having a first sensor. For example, the first camera is an IBIS camera 502 and the first sensor is an image sensor 504 (FIG. 5). The initial extrinsic calibration includes a rotation matrix and an initial translation matrix and is based on a first position of the first sensor when the first camera captures an initial image. For example, the initial image is an image used in initial calibration of the first camera, e.g., as performed in a factory calibration process. (block 802).

With continued reference to FIG. 8, calibration system 510 determines a first translation of the first sensor based on a second position thereof when the first camera captures a first image. The second position is different than the first position, e.g., because the first sensor has changed position due to activity of an IBIS system 506 (FIG. 5). (block 804).

With continued reference to FIG. 8, calibration system 510 determines a first extrinsic translation shift based at least upon the first translation. The first extrinsic translation shift represents a first net translation between the first and second positions of the first sensor (block 806).

With continued reference to FIG. 8, calibration system 510 updates the first initial extrinsic calibration to yield a first modified extrinsic calibration for the first camera based on the first extrinsic translation shift. The first modified extrinsic calibration includes the rotation matrix and a first adjusted translation matrix given by the summation of the first extrinsic translation shift with the initial translation matrix (block 808).

In some embodiments, with continued reference to FIG. 48 calibration system 510 causes a vehicle (e.g., vehicle 200 shown in FIG. 2) to operate based at least in part on output of the first camera.

In some embodiments, with continued reference to FIG. 8, calibration system 510 determines a second translation of the first sensor based on a third position thereof when the first camera captures a second image, the third position being different than the first position. In such embodiments, calibration system 510 determines a second extrinsic translation shift based at least upon the second translation. The second extrinsic translation shift represents a net translation between the first and third positions of the first sensor. In such embodiments, calibration system 510 updates the first initial extrinsic calibration to yield a second modified extrinsic calibration for the first camera based on the second extrinsic translation shift. The second modified extrinsic calibration includes the rotation matrix and a second adjusted translation matrix given by the summation of the second extrinsic translation shift with the initial translation matrix.

In some embodiments, with continued reference to FIG. 8, calibration system 510 receives a second initial extrinsic calibration of a second camera having a second sensor. The second initial extrinsic calibration includes a rotation matrix and an initial translation matrix and is based on a first position of the second sensor when the second camera captures an initial image. In such embodiments, calibration system 510 determines a second translation of the second sensor based on a second position thereof when the second camera captures a first image, such that the second position is different than the first position. In such embodiments, calibration system 510 determines a second extrinsic translation shift based at least upon the second translation. The second extrinsic translation shift represents a first net translation between the first and second positions of the second sensor. In such embodiments, calibration system 510 updates the second initial extrinsic calibration to yield a second modified extrinsic calibration for the second camera based on the second extrinsic translation shift. The second modified extrinsic calibration includes the rotation matrix and a second adjusted translation matrix given by the summation of the second extrinsic translation shift with the initial translation matrix.

In some embodiments, with continued reference to FIG. 8, calibration system 510 fuses the data of the first modified extrinsic calibration with data from a third sensor to rectify the at least one first image. In such embodiments, the third sensor may be a LIDAR sensor or a radar sensor.

In some embodiments, the first camera is an IBIS camera. In some embodiments, the second camera is an IBIS camera.

In some embodiments, the second sensor is stationary relative to the first sensor.

According to some non-limiting embodiments or examples, provided is a method of extrinsic camera calibration, comprising:

receiving, using at least one processor, a first initial extrinsic calibration of a first camera having a first sensor, wherein the initial extrinsic calibration includes a rotation matrix and an initial translation matrix and is based on a first position of the first sensor when the first camera captures an initial image;

determining, using the at least one processor, a first translation of the first sensor based on a second position thereof when the first camera captures a first image, the second position being different than the first position;

determining, using the at least one processor, a first extrinsic translation shift based at least upon the first translation, wherein the first extrinsic translation shift represents a first net translation between the first and second positions of the first sensor; and updating, using the at least one processor, the first initial extrinsic calibration to yield a first modified extrinsic calibration for the first camera based on the first extrinsic translation shift, wherein the first modified extrinsic calibration includes the rotation matrix and a first adjusted translation matrix given by the summation of the first extrinsic translation shift with the initial translation matrix.

Further non-limiting aspects or embodiments are set forth in the following numbered clauses:

Clause 1: A method of extrinsic camera calibration, comprising: receiving, using at least one processor, a first initial extrinsic calibration of a first camera having a first sensor, wherein the initial extrinsic calibration includes a rotation matrix and an initial translation matrix and is based on a first position of the first sensor when the first camera captures an initial image; determining, using the at least one processor, a first translation of the first sensor based on a second position thereof when the first camera captures a first image, the second position being different than the first position; determining, using the at least one processor, a first extrinsic translation shift based at least upon the first translation, wherein the first extrinsic translation shift represents a first net translation between the first and second positions of the first sensor; and updating, using the at least one processor, the first initial extrinsic calibration to yield a first modified extrinsic calibration for the first camera based on the first extrinsic translation shift, wherein the first modified extrinsic calibration includes the rotation matrix and a first adjusted translation matrix given by the summation of the first extrinsic translation shift with the initial translation matrix.

Clause 2: The method of clause 1, further comprising: determining, using the at least one processor, a second translation of the first sensor based on a third position thereof when the first camera captures a second image, the third position being different than the first position; determining, using the at least one processor, a second extrinsic translation shift based at least upon the second translation, wherein the second extrinsic translation shift represents a net translation between the first and third positions of the first sensor; and updating, using the at least one processor, the first initial extrinsic calibration to yield a second modified extrinsic calibration for the first camera based on the second extrinsic translation shift, wherein the second modified extrinsic calibration includes the rotation matrix and a second adjusted translation matrix given by the summation of the second extrinsic translation shift with the initial translation matrix.

Clause 3: The clause of claim 1 or 2, comprising: receiving, using the at least one processor, a second initial extrinsic calibration of a second camera having a second sensor, wherein the second initial extrinsic calibration includes a rotation matrix and an initial translation matrix and is based on a first position of the second sensor when the second camera captures an initial image; determining, using the at least one processor, a second translation of the second sensor based on a second position thereof when the second camera captures a first image, the second position being different than the first position; determining, using the at least one processor, a second extrinsic translation shift based at least upon the second translation, wherein the second extrinsic translation shift represents a first net translation between the first and second positions of the second sensor; and updating, using the at least one processor, the second initial extrinsic calibration to yield a second modified extrinsic calibration for the second camera based on the second extrinsic translation shift, wherein the second modified extrinsic calibration includes the rotation matrix and a second adjusted translation matrix given by the summation of the second extrinsic translation shift with the initial translation matrix.

Clause 4: The method of any of clauses 1-3, further comprising fusing the data of the first modified extrinsic calibration with data from a third sensor to rectify the at least one first image.

Clause 5: The method of clause 4, wherein the third sensor comprises a LIDAR sensor or a radar sensor.

Clause 6: The method of any of clauses 1-5, wherein the first camera comprises an IBIS camera.

Clause 7: The method of any of clauses 3-6, wherein the second camera comprises an IBIS camera.

Clause 8: The method of any of clauses 2-7, wherein the second sensor is stationary relative to the first sensor.

Clause 9: The method of any of clauses 1-8, comprising causing a vehicle to operate based at least in part on output of the first camera.

Clause 10: A vehicle comprising: at least one computer-readable medium storing computer-executable instructions; and one or more processors configured to execute the computer executable instructions, the execution carrying out the method of any of clauses 1-9.

Clause 11: A non-transitory computer-readable storage medium comprising at least one program for execution using at least one processor of a first device, the at least one program including instructions which, when executed using the at least one processor, cause the first device to perform the method of any of clauses 1-9.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method of extrinsic camera calibration, comprising:
receiving, using at least one processor, a first initial extrinsic calibration of a first camera having a first sensor, wherein the first initial extrinsic calibration includes a rotation matrix and an initial translation matrix and is based on a first position of the first sensor when the first camera captures an initial image;
determining, using the at least one processor, a first translation of the first sensor based on a second position thereof when the first camera captures a first image, the second position being different than the first position;
determining, using the at least one processor, a first extrinsic translation shift based at least upon the first translation, wherein the first extrinsic translation shift represents a first net translation between the first position and the second position of the first sensor; and
updating, using the at least one processor, the first initial extrinsic calibration to yield a first modified extrinsic calibration for the first camera based on the first extrinsic translation shift, wherein the first modified extrinsic calibration includes the rotation matrix and a first adjusted translation matrix given by a summation of the first extrinsic translation shift with the initial translation matrix.

2. The method of claim 1, further comprising:
determining, using the at least one processor, a second translation of the first sensor based on a third position thereof when the first camera captures a second image, the third position being different than the first position;
determining, using the at least one processor, a second extrinsic translation shift based at least upon the second translation, wherein the second extrinsic translation shift represents a net translation between the first position and the third position of the first sensor; and
updating, using the at least one processor, the first initial extrinsic calibration to yield a second modified extrinsic calibration for the first camera based on the second extrinsic translation shift, wherein the second modified extrinsic calibration includes the rotation matrix and a second adjusted translation matrix given by a summation of the second extrinsic translation shift with the initial translation matrix.

3. The method of claim 1, comprising:
receiving, using the at least one processor, a second initial extrinsic calibration of a second camera having a second sensor, wherein the second initial extrinsic calibration includes a rotation matrix and an initial translation matrix and is based on a first position of the second sensor when the second camera captures an initial image;
determining, using the at least one processor, a second translation of the second sensor based on the second position thereof when the second camera captures a first image, the second position being different than the first position;
determining, using the at least one processor, a second extrinsic translation shift based at least upon the second translation, wherein the second extrinsic translation shift represents a first net translation between the first position and the second position of the second sensor; and
updating, using the at least one processor, the second initial extrinsic calibration to yield a second modified extrinsic calibration for the second camera based on the second extrinsic translation shift, wherein the second modified extrinsic calibration includes the rotation matrix and a second adjusted translation matrix given by the summation of the second extrinsic translation shift with the initial translation matrix.

4. The method of claim 3, further comprising fusing the data of the first modified extrinsic calibration with data from a third sensor to rectify the first image.

5. The method of claim 4, wherein the third sensor comprises a LIDAR sensor or a radar sensor.

6. The method of claim 3, wherein the second camera comprises an IBIS camera.

7. The method of claim 3, wherein the second sensor is stationary relative to the first sensor.

8. The method of claim 1, wherein the first camera comprises an IBIS camera.

9. The method of claim 1, comprising causing a vehicle to operate based at least in part on output of the first camera.

10. A vehicle comprising:
at least one computer-readable medium storing computer-executable instructions; and
one or more processors configured to execute the computer-executable instructions, the execution carrying out operations comprising:
receiving, using at least one processor, a first initial extrinsic calibration of a first camera having a first sensor, wherein the first initial extrinsic calibration includes a rotation matrix and an initial translation matrix and is based on a first position of the first sensor when the first camera captures an initial image;
determining, using the at least one processor, a first translation of the first sensor based on a second position thereof when the first camera captures a first image, the second position being different than the first position;
determining, using the at least one processor, a first extrinsic translation shift based at least upon the first translation, wherein the first extrinsic translation shift represents a first net translation between the first position and the second position of the first sensor; and
updating, using the at least one processor, the first initial extrinsic calibration to yield a first modified extrinsic calibration for the first camera based on the first extrinsic translation shift, wherein the first modified extrinsic calibration includes the rotation matrix and a first adjusted translation matrix given by a summation of the first extrinsic translation shift with the initial translation matrix.

11. A non-transitory computer-readable storage medium comprising at least one program for execution using at least one processor of a first device, the at least one program including instructions which, when executed using the at least one processor, cause the first device to perform operations comprising:
receiving, using the at least one processor, a first initial extrinsic calibration of a first camera having a first sensor, wherein the first initial extrinsic calibration includes a rotation matrix and an initial translation matrix and is based on a first position of the first sensor when the first camera captures an initial image;
determining, using the at least one processor, a first translation of the first sensor based on a second position thereof when the first camera captures a first image, the second position being different than the first position;
determining, using the at least one processor, a first extrinsic translation shift based at least upon the first translation, wherein the first extrinsic translation shift represents a first net translation between the first position and the second position of the first sensor; and updating, using the at least one processor, the first initial extrinsic calibration to yield a first modified extrinsic calibration for the first camera based on the first extrinsic translation shift, wherein the first modified extrinsic calibration includes the rotation matrix and a first adjusted translation matrix given by a summation of the first extrinsic translation shift with the initial translation matrix.

12. The vehicle of claim 10, wherein the execution further carrying out operations comprising:

determining, using the at least one processor, a second translation of the first sensor based on a third position thereof when the first camera captures a second image, the third position being different than the first position;

determining, using the at least one processor, a second extrinsic translation shift based at least upon the second translation, wherein the second extrinsic translation shift represents a net translation between the first position and the third position of the first sensor; and updating, using the at least one processor, the first initial extrinsic calibration to yield a second modified extrinsic calibration for the first camera based on the second extrinsic translation shift, wherein the second modified extrinsic calibration includes the rotation matrix and a second adjusted translation matrix given by a summation of the second extrinsic translation shift with the initial translation matrix.

13. The vehicle of claim 10, wherein the execution further carrying out operations comprising:

receiving, using the at least one processor, a second initial extrinsic calibration of a second camera having a second sensor, wherein the second initial extrinsic calibration includes a rotation matrix and an initial translation matrix and is based on a first position of the second sensor when the second camera captures an initial image;

determining, using the at least one processor, a second translation of the second sensor based on the second position thereof when the second camera captures a first image, the second position being different than the first position;

determining, using the at least one processor, a second extrinsic translation shift based at least upon the second translation, wherein the second extrinsic translation shift represents a first net translation between the first position and the second position of the second sensor; and updating, using the at least one processor, the second initial extrinsic calibration to yield a second modified extrinsic calibration for the second camera based on the second extrinsic translation shift, wherein the second modified extrinsic calibration includes the rotation matrix and a second adjusted translation matrix given by the summation of the second extrinsic translation shift with the initial translation matrix.

14. The vehicle of claim 13, wherein the execution further carrying out operations comprising fusing the data of the first modified extrinsic calibration with data from a third sensor to rectify the first image.

15. The vehicle of claim 14, wherein the third sensor comprises a LIDAR sensor or a radar sensor.

16. The vehicle of claim 10, wherein the first camera comprises an IBIS camera.

17. The vehicle of claim 13, wherein the second camera comprises an IBIS camera.

18. The vehicle of claim 13, wherein the second sensor is stationary relative to the first sensor.

19. The vehicle of claim 10, wherein the execution further carrying out operations comprising causing the vehicle to operate based at least in part on output of the first camera.

20. The non-transitory computer-readable storage medium of claim 11, wherein the at least one program including the instructions which, when executed using the at least one processor, cause the first device to further perform operations comprising:

determining, using the at least one processor, a second translation of the first sensor based on a third position thereof when the first camera captures a second image, the third position being different than the first position;

determining, using the at least one processor, a second extrinsic translation shift based at least upon the second translation, wherein the second extrinsic translation shift represents a net translation between the first position and the third position of the first sensor; and updating, using the at least one processor, the first initial extrinsic calibration to yield a second modified extrinsic calibration for the first camera based on the second extrinsic translation shift, wherein the second modified extrinsic calibration includes the rotation matrix and a second adjusted translation matrix given by a summation of the second extrinsic translation shift with the initial translation matrix.

21. The non-transitory computer-readable storage medium of claim 11, wherein the at least one program including the instructions which, when executed using the at least one processor, cause the first device to further perform operations comprising:

receiving, using the at least one processor, a second initial extrinsic calibration of a second camera having a second sensor, wherein the second initial extrinsic calibration includes a rotation matrix and an initial translation matrix and is based on a first position of the second sensor when the second camera captures an initial image;

determining, using the at least one processor, a second translation of the second sensor based on the second position thereof when the second camera captures a first image, the second position being different than the first position;

determining, using the at least one processor, a second extrinsic translation shift based at least upon the second translation, wherein the second extrinsic translation shift represents a first net translation between the first position and the second position of the second sensor; and updating, using the at least one processor, the second initial extrinsic calibration to yield a second modified extrinsic calibration for the second camera based on the second extrinsic translation shift, wherein the second modified extrinsic calibration includes the rotation matrix and a second adjusted translation matrix given by the summation of the second extrinsic translation shift with the initial translation matrix.

22. The non-transitory computer-readable storage medium of claim 21, wherein the at least one program including the instructions which, when executed using the at least one processor, cause the first device to further perform operations comprising fusing the data of the first modified extrinsic calibration with data from a third sensor to rectify the first image.

23. The non-transitory computer-readable storage medium of claim 22, wherein the third sensor comprises a LIDAR sensor or a radar sensor.

24. The non-transitory computer-readable storage medium of claim 11, wherein the first camera comprises an IBIS camera.

25. The non-transitory computer-readable storage medium of claim 21, wherein the second camera comprises an IBIS camera.

26. The non-transitory computer-readable storage medium of claim 21, wherein the second sensor is stationary relative to the first sensor.

27. The non-transitory computer-readable storage medium of claim 11, wherein the at least one program including the instructions which, when executed using the at least one processor, cause the first device to further perform operations comprising causing a vehicle to operate based at least in part on output of the first camera.

* * * * *